Figure 1:
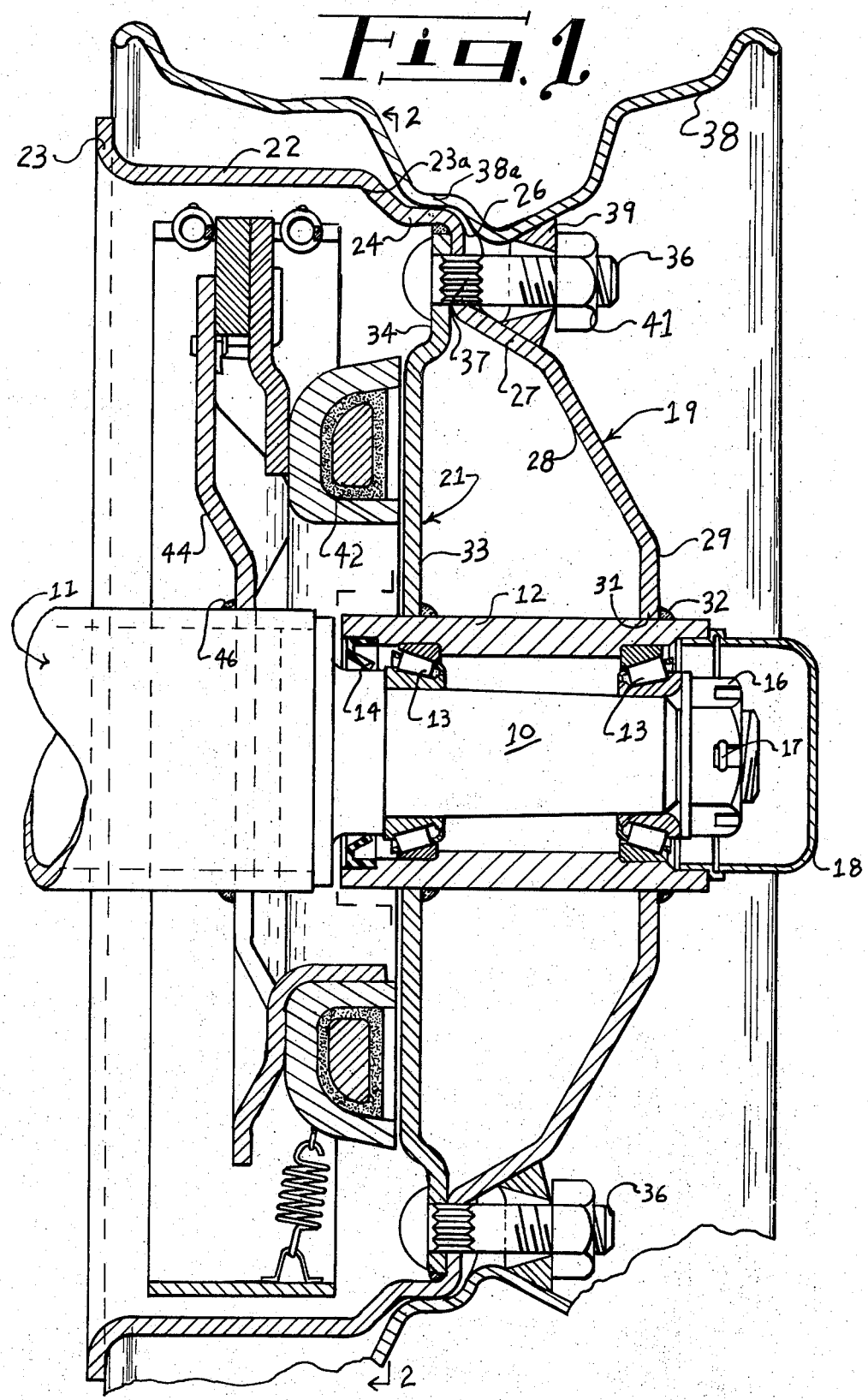

United States Patent [19]

Studdard et al.

[11] 3,810,678

[45] May 14, 1974

[54] FABRICATED BRAKE DRUM AND HUB ASSEMBLY

[75] Inventors: Donald T. Studdard, Winfield; Thomas E. Morrison, Guin, both of Ala.

[73] Assignee: Continental Conveyor and Equipment Company

[22] Filed: Aug. 30, 1972

[21] Appl. No.: 285,021

[52] U.S. Cl. ............................................. 301/6 S
[51] Int. Cl. ....................... B60b 23/10, B60b 19/00
[58] Field of Search .......... 301/6 S, 6 R, 6 CS, 6 W

[56] References Cited
UNITED STATES PATENTS

| | | | |
|---|---|---|---|
| 2,133,597 | 10/1938 | Tjaarda | 301/6 S |
| 2,155,667 | 4/1939 | LeJeune | 301/6 S |
| 3,004,796 | 10/1961 | Atkin | 301/6 S |
| 3,043,631 | 7/1962 | Swoboda | 301/6 CS |
| 1,916,747 | 7/1933 | Wagenhorst | 301/6 S |

FOREIGN PATENTS OR APPLICATIONS

| | | | |
|---|---|---|---|
| 768,740 | 5/1934 | France | 301/6 S |

Primary Examiner—Richard J. Johnson
Attorney, Agent, or Firm—Hugh P. Carter

[57] ABSTRACT

A brake drum and hub assembly in which the brake drum and a central portion thereof which is joined to the outer periphery of the hub is made of a single sheet of stamped steel. A second, inwardly disposed steel stamping is joined to the hub inwardly of the central portion of the brake drum and is connected to the brake drum section at a point outwardly of the hub by means of lug bolts which lug bolts, in association with lugs, are adapted removably to mount a rim for a pneumatic tire.

1 Claim, 2 Drawing Figures

FABRICATED BRAKE DRUM AND HUB ASSEMBLY

Our invention relates to vehicle wheels and more particularly to fabricated brake drum and hub assemblies which themselves constitute a wheel adapted to receive a rim for mounting a pneumatic tire.

An object of our invention is to provide a low cost, accurately manufactured, rim supporting wheel for vehicles which includes a brake drum integrally formed from one stamping of steel sheet material with an outer, centrally disposed flange portion for the wheel, the remainder of the wheel being completed by an inner disc secured at its outer periphery to a portion of the brake drum - outer disc member by means of bolts which also serve as lug bolts for securing the rim, both of said discs being welded to the outer periphery of a machined hub which receives the wheel bearings.

A further object of our invention is to provide a wheel of the character designated in which the steel stamping from which the outer disc and brake drum section is fabricated is formed in a specific way, namely, which at least includes a radially directed portion located between the brake drum proper and the disc portion proper and to which the outer periphery of the inner disc member which completes the wheel may be secured by said bolts.

Generally, a further object is to provide a construction for wheels which may be quickly and economically manufactured and yet, although made essentially of three parts, namely the brake drum - outer disc portion, the inner disc portion and the hub itself, nevertheless results in a wheel which has a great amount of strength and which is easily assembled.

Figure 2:
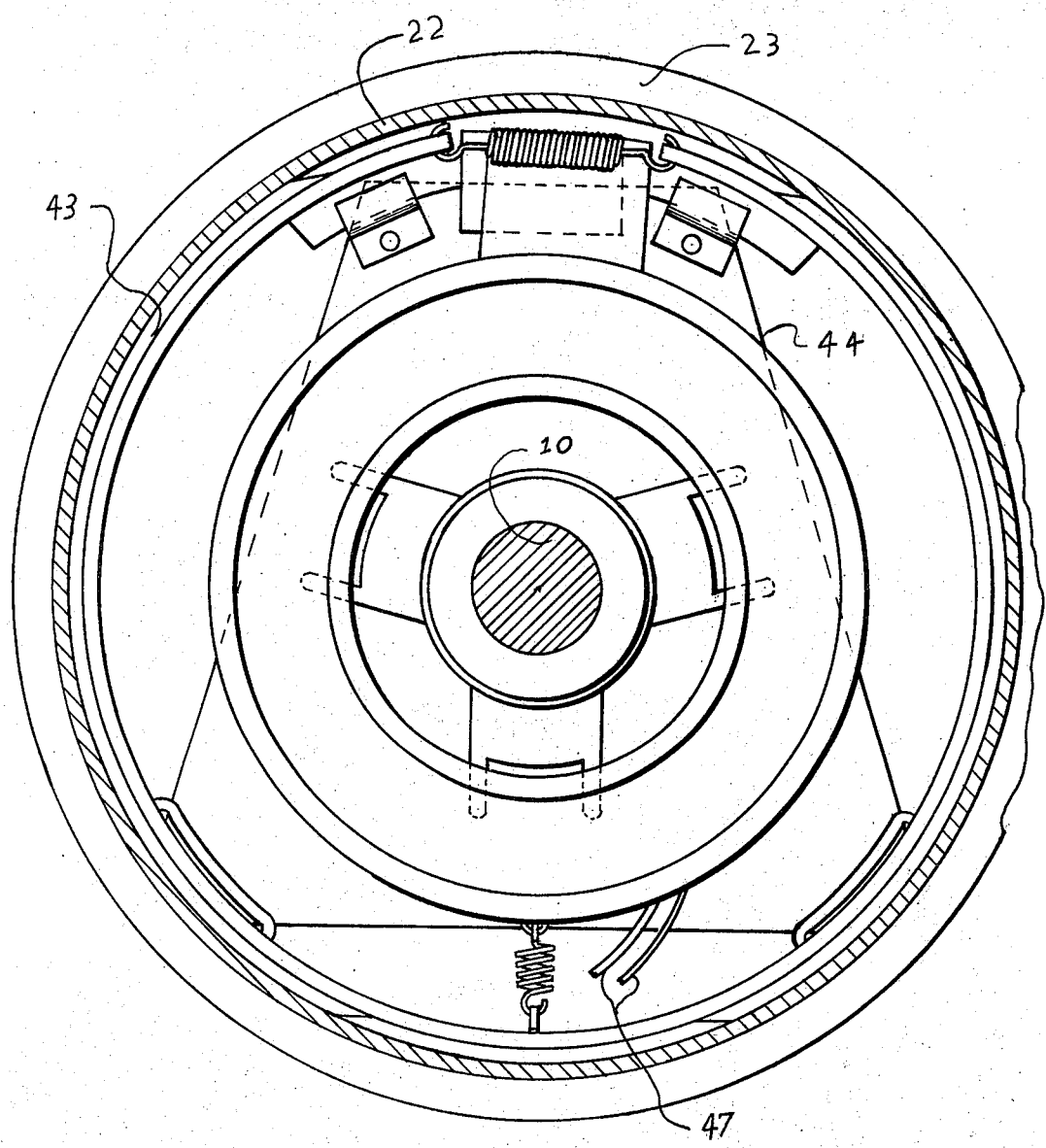

A wheel illustrating features of our invention is shown in the accompanying drawings forming a part of this application, in which:

FIG. 1 is a vertical sectional view through a wheel mounted on an axle spindle, a rim for a pneumatic tire being indicated as being in place, and the view being broken away and partly in section; and FIG. 2 is a detail sectional view taken generally along line 2—2 of FIG. 1.

Referring now to the drawings for a better understanding of our invention we show the same as being mounted upon a spindle 10 carried in the end of a tubular axle 11. As will be understood, our improved wheel embodies a hub proper indicated at 12 and which may be made by properly machining a length of seamless tubing. In customary fashion the hub is mounted on roller bearings 13, there being a grease seal 14 at the inner end of the hub. The hub is held onto the spindle by means of the nut 16 and locked thereon by the cotter pin 17. The end of the hub is covered by the usual dust cap 18.

In addition to the hub, our improved wheel comprises essentially two parts. First, there is the brake drum - outer disc section indicated generally by the numeral 19 and second, the inner, generally radially extending disc portion indicated generally by the numeral 21.

The portion 19 may be formed entirely of a single sheet of steel which is stamped to the configuration particularly shown in FIG. 1. Thus, the brake drum proper indicated at 22 may have an outturned section 23 at its inner periphery. This adds considerably to the strength of the brake drum. Next outwardly of the brake drum 22 proper is an inwardly and downwardly bent section 23a, thence an axially parallel section 24, followed by a radially directed, inwardly bent section 26. From the inner end of the section or portion 26 the plate is bent outwardly and inwardly as indicated at 27 and thence further outwardly and inwardly as at 28 and thence radially again as at 29. The radial portion is bored as at 31 to fit snugly over the outer surface of the hub 12 and is welded thereto as at 32.

The inner disc portion of the wheel comprises the radially extending portion 33, at the periphery of which is the axially outwardly and thence radially bent section 34. It will be noted that the section 34 is disposed to lie flush against the section 26 so that a number of lug bolts 36 may be passed through these contacting portions. The bolts may be held captive in the parts or sections 34 and 36 by the axial roughening of the shanks of the same near the heads as indicated at 37, in the customary fashion.

The rim which is to receive the pneumatic tire preferably is of the drop center type and is indicated at 38. The central, dropped section of the rim has a portion 38a which is adapted to fit over the portion 24. Lugs 39 may be provided so that when nuts 41 thereon are drawn up on the bolts 36 the rim itself is wedged tightly into running position relative to the section 24 of the brake drum and disc member 19.

At 42 we have indicated diagrammatically an electromagnet for operating the brake, namely, for expanding the brake band 43 outwardly into contact with the inner surface of the brake drum 22. The actual brake mechanism itself is well known in the art and consists of the back plate 44, welded to the axle at 46, as well as the remaining parts which are well known in the art. In any event, whenever energy is supplied to the magnet through the leads 47 (see FIG. 2) the brake is applied.

From the foregoing it will be seen that we have provided an improved, low cost, easily manufactured wheel which may be fabricated essentially from three parts, namely, two steel stampings 19 and 21 and the hub 12 which may be a simple machine turned part formed of standard stock. By having the radial portions 34 and 26 lie in contact with each other, it is possible to secure the entire wheel together, including holding the rim removably thereon, by means of the common lug bolts 36. It will be apparent that when the nuts 41 are run up the heads of the bolts lying inwardly of the inner surfaces of the section 34, in combination with the lugs 39, draw all of the parts together, including pressing the section 26 tightly agianst section 34 while at the same time removably holding the rim in place.

In actual practice our invention has proven to be extremely practical. We have greaty reduced the cost of manuracturing wheels of this general type and have speeded up the fabrication thereof. Instead of casting the brake drum and disc portion 19 we are enabled to fabricate the same, as stated, from a steel plate which simply is stamped out in mass production. We have further noted that heat dissipation between the brake drum 22 proper and the atmosphere is excellent and we have noted no difficulty to speak of in connection with overheating of the units in service.

While we have shown our invention in but one form, it will be obvious to those skilled in the art that it is not so limited, but is susceptible of various other changes and modifications without departing from the spirit thereof.

What we claim is:

1. In a wheel, brake drum and hub assembly,
   a. an axially extending cylindrical brake drum formed of sheet metal and having formed integrally therewith a radially outturned strengthening flange located on the inner end of the brake drum,
   b. a first radially inwardly and then axially outwardly extending cylindrical section next adjoining the outer periphery of the brake drum,
   c. a radially extending disc-like section integrally joined to the outer periphery of said outwardly extending cylindrical section,
   d. a second radially inwardly and then outwardly extending section integrally joined to the radially inner periphery of said disc-like portion,
   e. a centrally disposed radially directed section integrally joined to the inner periphery of said second radially inwardly and outwardly extending section,
   f. a separately formed radially disposed disc-like member spaced inwardly of said centrally disposed radially directed section,
   g. a centrally disposed hub passing through the center of said centrally disposed radially directed section and said separately formed disc-like member, said disc-like section and disc-like member being secured to the outer surface of the hub and the outer periphery of the disc-like member lying alongside said first radially inwardly directed cylindrical section,
   h. a rim for a pneumatic tire disposed for a portion of its inner periphery to fit snugly about the outer periphery of said first radially inwardly extending section and in an area thereof generally in radial alignment with said separately formed disc-like member,
   i. threaded bolts passing through said first radially inward extending section and said separately formed disc-like member in the areas where they lie alongside each other, and
   j. lugs on said bolts on the outer side of the assembly effective to hold the rim removably in place.

* * * * *